United States Patent
Eads et al.

(12) 
(10) Patent No.: US 11,535,051 B2
(45) Date of Patent: Dec. 27, 2022

(54) MOUNTING SYSTEM FOR ANIMAL TROPHIES

(71) Applicant: Rack Hub, LLC, Urbana, IN (US)

(72) Inventors: Thad J. Eads, Urbana, IN (US); Jason D. Eads, Corydon, IA (US)

(73) Assignee: Rack Hub, LLC, Urbana, IN (US)

(*) Notice: Subject to any disclaimer, the term of this patent is extended or adjusted under 35 U.S.C. 154(b) by 937 days.

(21) Appl. No.: 16/295,443

(22) Filed: Mar. 7, 2019

(65) Prior Publication Data

US 2019/0275832 A1 Sep. 12, 2019

Related U.S. Application Data

(60) Provisional application No. 62/639,744, filed on Mar. 7, 2018.

(51) Int. Cl.
| | |
|---|---|
| *B44C 5/02* | (2006.01) |
| *G09B 23/36* | (2006.01) |
| *B44C 5/06* | (2006.01) |
| *F16M 13/02* | (2006.01) |
| *A47F 5/08* | (2006.01) |
| *B29L 31/00* | (2006.01) |

(52) U.S. Cl.
CPC .............. *B44C 5/02* (2013.01); *A47F 5/0807* (2013.01); *B44C 5/06* (2013.01); *F16M 13/02* (2013.01); *G09B 23/36* (2013.01); *B29L 2031/7028* (2013.01)

(58) Field of Classification Search
CPC .. B44C 5/02; B44C 5/06; F16M 13/02; G09B 23/36; A47F 5/0807; B29L 2031/7028
See application file for complete search history.

(56) References Cited

U.S. PATENT DOCUMENTS

| | | | |
|---|---|---|---|
| 3,319,922 A | | 5/1967 | Christensen |
| 4,464,440 A | * | 8/1984 | Dotzman ................. B44C 5/02 |
| | | | 434/296 |
| 4,717,626 A | | 1/1988 | Badger |

(Continued)

OTHER PUBLICATIONS

Mueller, John. The Skull-Lok European Mounting Bracket. Sep. 15, 2010. Retrieved from the Internet: <URL: www.bowhunting.com/blog/2010/09/15/the-easiest-european-skull-mounting-system-available/>.

(Continued)

*Primary Examiner* — Eret C McNichols
(74) *Attorney, Agent, or Firm* — Innovation Law Office; Dennis S. Schell

(57) ABSTRACT

Mounting systems and methods, including those for mounting animal trophies, are disclosed. Embodiments can include a ball, a coupling member for coupling the animal trophy to the ball, and a base having a locking feature. The base can further include a bearing seat which is configured to support a portion of the ball and permit the ball to simultaneously rotate about three axes. Embodiments can further include a cap having a retaining feature at a first end and a second locking feature at a second end. The cap can be configured to mate with the first locking feature of the base and form a locked connection with the base. The cap can retain the ball in a position between the retaining feature and the base, providing increased force onto the ball and securing the position of the ball and animal trophy relative to the base.

12 Claims, 8 Drawing Sheets

(56) References Cited

U.S. PATENT DOCUMENTS

| | | | | |
|---|---|---|---|---|
| 4,971,865 | A | * | 11/1990 | Nowlan ............... B44C 5/02 434/296 |
| 5,472,765 | A | * | 12/1995 | Green ............... B44C 5/02 434/296 |
| 6,828,035 | B1 | | 12/2004 | Goettl |
| 8,512,045 | B2 | | 8/2013 | Bittner |
| 9,248,696 | B2 | | 2/2016 | Maria et al. |
| D760,066 | S | | 6/2016 | Krenek |
| 10,035,374 | B2 | * | 7/2018 | Martin ............... B44C 5/02 |
| 10,400,950 | B1 | * | 9/2019 | Hauser ............... F16M 11/04 |
| 10,682,881 | B2 | * | 6/2020 | Taylor ............... F21V 33/0028 |
| 10,718,465 | B2 | * | 7/2020 | Wall ............... F16M 11/22 |
| 2006/0154224 | A1 | * | 7/2006 | St.Ama ............... G09B 23/36 434/296 |
| 2007/0232184 | A1 | | 10/2007 | Renyo |
| 2008/0069977 | A1 | | 3/2008 | McAbee |
| 2009/0026347 | A1 | * | 1/2009 | Noon ............... B44C 5/02 434/296 |
| 2009/0075245 | A1 | | 3/2009 | Hacke |
| 2011/0031363 | A1 | | 2/2011 | Shaw |
| 2011/0183085 | A1 | | 7/2011 | Spiess |
| 2012/0043442 | A1 | * | 2/2012 | Heffernon ............ F16M 11/041 248/224.8 |
| 2012/0056060 | A1 | | 3/2012 | Parton |
| 2012/0107634 | A1 | | 5/2012 | Swarthout |
| 2013/0126689 | A1 | | 5/2013 | Richards |
| 2013/0215617 | A1 | | 8/2013 | Carroll |
| 2014/0230220 | A1 | | 8/2014 | Allred et al. |
| 2015/0076731 | A1 | * | 3/2015 | Walton, Jr. ............. B44C 5/02 264/242 |
| 2015/0130103 | A1 | * | 5/2015 | Dewey ............... B29C 44/1271 264/46.6 |
| 2015/0258844 | A1 | * | 9/2015 | Byrns ............... B44C 5/02 29/458 |
| 2016/0101645 | A1 | | 4/2016 | Appel et al. |
| 2017/0239979 | A1 | | 8/2017 | Russell |
| 2019/0275832 | A1 | * | 9/2019 | Eads ............... A01M 31/00 |

OTHER PUBLICATIONS

"Shed Bed Antler Display," Web page <antleritis.com/store/shed-bed/>, 4 pages, Mar. 20, 2016, retrieved from the Internet Archive Wayback Machine <https://web.archive.org/web/20160320174823/https://antleritis.com/store/shed-bed/> on Oct. 13, 2020.

"Antler Mount Kits," Web page <thefirepitgallery.com/product-category/melissa-crisp-art/antler-mount-kits/>, 1 page, Apr. 11, 2018, retrieved from the Internet Archive Wayback Machine <https://web.archive.org/web/20180411182850/thefirepitgallery.com/product-category/melissa-crisp-art/antler-mount-kits/> on Oct. 13, 2020.

"Tine Tower Antler Shed 48" Wall Display for Deer, Elk,Moose, Caribou, Reindeer, Stag. Great Outdoorsman Gift", Web page <tinetower.storenvy.com/products/16726050-tine-tower-antler-shed-48-wall-display-for-deer-elk-moose-caribou-reind/>, 2 pages, May 8, 2016, retrieved from the Internet Archive Wayback Machine <https://web.archive.org/web/20160508141514/tinetower.storenvy.com/products/16726050-tine-tower-antler-shed-48-wall-display-for-deer-elk-moose-caribou-reind/>on Oct. 13, 2020.

"Skull Mounts", Web page <http://herronoutdoors.com/skull-mounts/>, 12 pages, Nov. 5, 2016, retrieved from the Internet Archive Wayback Machine <https://web.archive.org/web/20161105174520/http://herronoutdoors.com/skull-mounts/> on Oct. 13, 2020.

The Finest in Professional Skull Taxidermy and Antler Mounting Services; Pinterest post by ClassicAntlerMounts.com, Retrieved from the internet on or before Feb. 15, 2018 from: <URL: pinterest.com/pin/166492517455679726/>.

"Mountain Mike's Skull Plate Kit—Shed Spreader," Woods Outdoors, 4 pages, Retrieved from the internet on or before Feb. 15, 2018 from: <URL: https://www.woodsoutdoors.com/product/22622?osCsid=4gal9815frjl3t49cebgosmql3>.

"Mule Deer European Replica Skull Mount half skull," Wyoming Wildlife Productions L.L.C., 5 pages, Retrieved from the internet on or before Febmary 15, 2018 from: <URL: www.wyomingwildlifeproductions.com/product/mule-deer-european-replica-skull-mount-half-skull-with-square-stock/>.

"Do-All Outdoors Iron Bull Shed Adapter Kit," Sportsman's Guide, 3 pages, Retrieved from the internet on or before Feb. 15, 2018 from: <URL: www.sportsmansguide.com/product/index/do-all-outdoors-iron-bull-shed-adapter-kit?a=460202/>.

Skull Master European Mount Kit for Deer, Mountain Mike's Reproductions, 13 pages, Retrieved from the internet on or before Feb. 15, 2018 from: <URL: https://masterofskulls.com/store/skull-master-european-mount-kit-deer/>.

"Steelcap Authentic Antler Mounting Kit," Amazon.com, 1 page, Retrieved from the internet on or before Feb. 15, 2018 from: <URL: https://www.amazon.com/Steelcap-Authentic-Antler-Mounting-Kit/dp/B00GVI1FUY>.

McKenzie Taxidermy Supply; The VanDyke's—Jonas Print 2017 Catalog, Skull Caps—Antler Systems Product Catalog Page; p. 661, Viewed on or before Feb. 16, 2018.

Internet Search Results for "camera mounts" on www.google.com; retrieved from the internet on or before Feb. 15, 2018.

"Composite Single Socket Ball Mount with Round Base", Web page <https://www.themountdepot.com/RAP_B_104U_p/rap-b-104u.htm>, 2 pages, Feb. 22, 2011, retrieved from the Internet Archive Wayback Machine <https://web.archive.org/web/20110222185731/http://www.themountdepot.com/RAP_B_104U_p/rap-b-104u.htm> on Nov. 12, 2020.

"JBL wall mount for JBL Control 1 speakers", Web page <https://www.bax-shop.co.uk/speaker-brackets/jbl-wall-mount-for-jbl-control-1-speakers>, 4 pages, Oct. 16, 2017, retrieved from the Internet Archive Wayback Machine <https://web.archive.org/web/20171016090128/https://www.bax-shop.co.uk/speaker-brackets/jbl-wall-mount-for-jbl-control-1-speakers> on Nov. 12, 2020.

"Pair Heavy Duty Black Speaker Adjustable Wall Mount Brackets Up to 2kg", Web page <https://www.ebay.com.au/itm/Pair-Heavy-Duty-Black-Speaker-Adjustable-Wall-Mount-Brackets-Up-to-2kg-/330629010211>, 6 pages, Jan. 10, 2017, retrieved from the Internet Archive Wayback Machine <http://web.archive.org/web/20170110052920/https://www.ebay.com.au/itm/Pair-Heavy-Duty-Black-Speaker-Adjustable-Wall-Mount-Brackets-Up-to-2kg-/330629010211> on Oct. 22, 2021.

"PinPoint AM-20 Universal Speaker Wall/Ceiling Mount", Pro Acoustics, Web page <https://www.proacousticsusa.com/pinpoint-am-20-universal-speaker-wallceiling-mount.html>, 1 page, Jul. 10, 2017, retrieved from the Internet Archive Wayback Machine <http://web.archive.org/web/20170710201553/http://www.proacousticsusa.com/home-audio-equipment/home-audio-accessories/brackets-stands/pinpoint-am-20-universal-speaker-wallceiling-mount.html> on Oct. 22, 2021.

TK Mounts homepage, Web page <https://www.tkmounts.com>, 1 page, Aug. 22, 2018, retrieved from the Internet Archive Wayback Machine <http://web.archive.org/web/20180822211649/https://www.tkmounts.com/> on Oct. 22, 2021.

Head Hangerz. Head Hangerz Corner Bracket. Jan. 18, 2018. Retrieved from the Internet: <URL: https://www.facebook.com/headhangerz/posts/1580111735358881>.

* cited by examiner

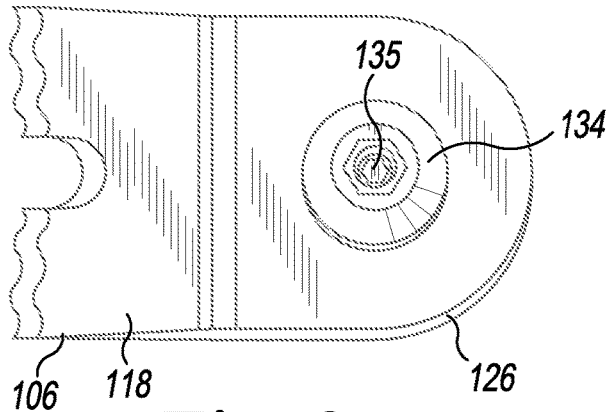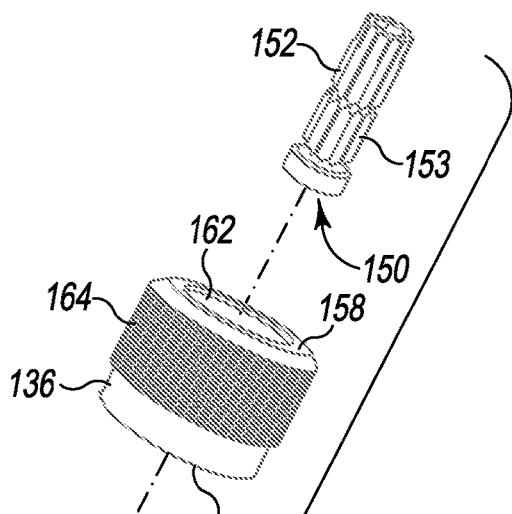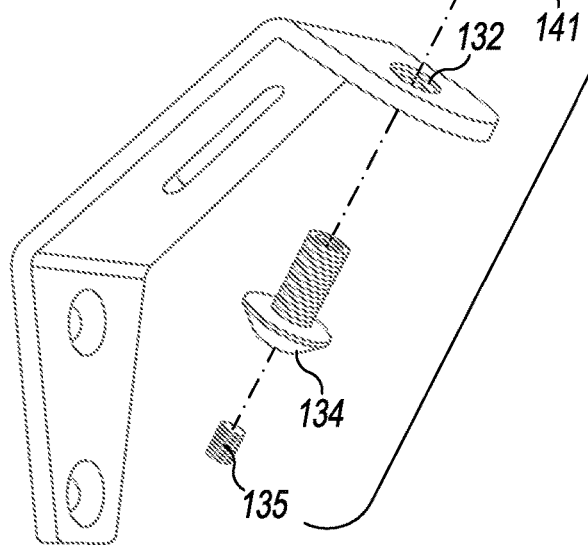

MOUNTING SYSTEM FOR ANIMAL TROPHIES

CROSS-REFERENCE TO RELATED APPLICATIONS

This application claims the benefit of U.S. Provisional Application No. 62/639,744, filed Mar. 7, 2018 and titled "Mounting System for Animal Trophies," the entirety of which is hereby incorporated herein by reference.

TECHNICAL FIELD

Embodiments of this disclosure relate generally to mounting systems, and more particularly to systems for mounting and displaying animal trophies.

BACKGROUND

Hunters and others are known to collect animal trophies, such as parts of animals, including skulls, horns, antlers, animals, and other animal parts. For example, a deer typically casts its antlers, known as shed antlers, between January and April each year and then grows a new set. Shed hunting is becoming a popular late winter to spring activity. Due to quality deer management practices, shed antlers are more often being found each year. Also, hunters may remove portions of their harvested animals, such as horns, antlers or the upper body, including the head to preserve via taxidermy.

There are limited systems and methods for properly and conveniently displaying animal trophies. For example, some shed antlers are laid out for decor or mounted to a fake animal skull if the antlers are a matching set. Other shed antlers are incorporated into chandeliers, coat hangers, or other household or decorative items. Devices for mounting and displaying animal trophies do not facilitate or otherwise lack the versatility to accommodate a display of matching antler sets, single antlers, and cut-off antlers. Also, many devices for mounting and displaying animal trophies require skill to position and permanently fix, using adhesives, putty, and the like, the animal trophies in manners (e.g., at particular angles) which provide a realistic animal appearance. Most prior art systems, therefore, do not enable the animal trophy to be periodically demounted for handling, such as for story-telling or simply holding for inspection, and for those that do, the repeated demounting (i.e., disconnecting) and mounting (i.e. connecting) of an animal at the point of attachment with the trophy can damage and degrade the internal structures (e.g., bone and tissue) of the trophy. As such, it was realized by the inventors of the current disclosure that improvements in animal trophy mounting systems are needed.

SUMMARY

Embodiments of the present disclosure provide an improved mounting system for animal trophies. In accordance with a first aspect of embodiments of the present disclosure, a mounting system can include a ball, a coupling member for coupling the animal trophy to the ball, and a base having a locking feature. The base can further include a bearing seat which is configured to support a portion of the ball and permit the ball to simultaneously rotate about three axes. Embodiments can also include a cap having a retaining feature at a first end and a second locking feature at a second end. The cap can be configured to mate with the first locking feature of the base and form a locked connection with the base. The cap can retain the ball in a position between the retaining feature and the base, providing increased force onto the ball and securing the position of the ball and animal trophy relative to the base. In some embodiments, the coupling member can be a polygonal post. In other embodiments, the coupling member can be defined by a portion of the ball.

In another aspect of the embodiments of the present disclosure, the mounting system can include an interface insert coupled to the animal trophy and configured to releasably mate with the coupling member, wherein the interface insert can define a cross-section that fixes the axial rotation of the interface insert. Other embodiments can also include a bore defined by the ball, wherein the coupling member is coupled to the animal trophy and configured to mate with the bore of the ball, and wherein the bore can define a cross-section that fixes the rotation of the coupling member relative to the ball.

In yet another aspect of the embodiments of the present disclosure, the mounting system can include a flexible pad positioned between the ball and the base for increasing the friction applied to the ball by the base. Other embodiments can include a support bracket defining a first mounting feature and a second mounting feature, and a first fastener, wherein the first mounting feature is coupled to the base of a first joint mechanism by the first fastener and the second mounting feature is coupled to a mounting surface.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 2 depicts an exploded view of the exemplary mounting system of FIG. 1;

FIG. 3 depicts a partial bottom view of a support bracket of the exemplary mounting system of FIG. 1;

DETAILED DESCRIPTION OF THE ILLUSTRATED EMBODIMENTS

Figure 1:
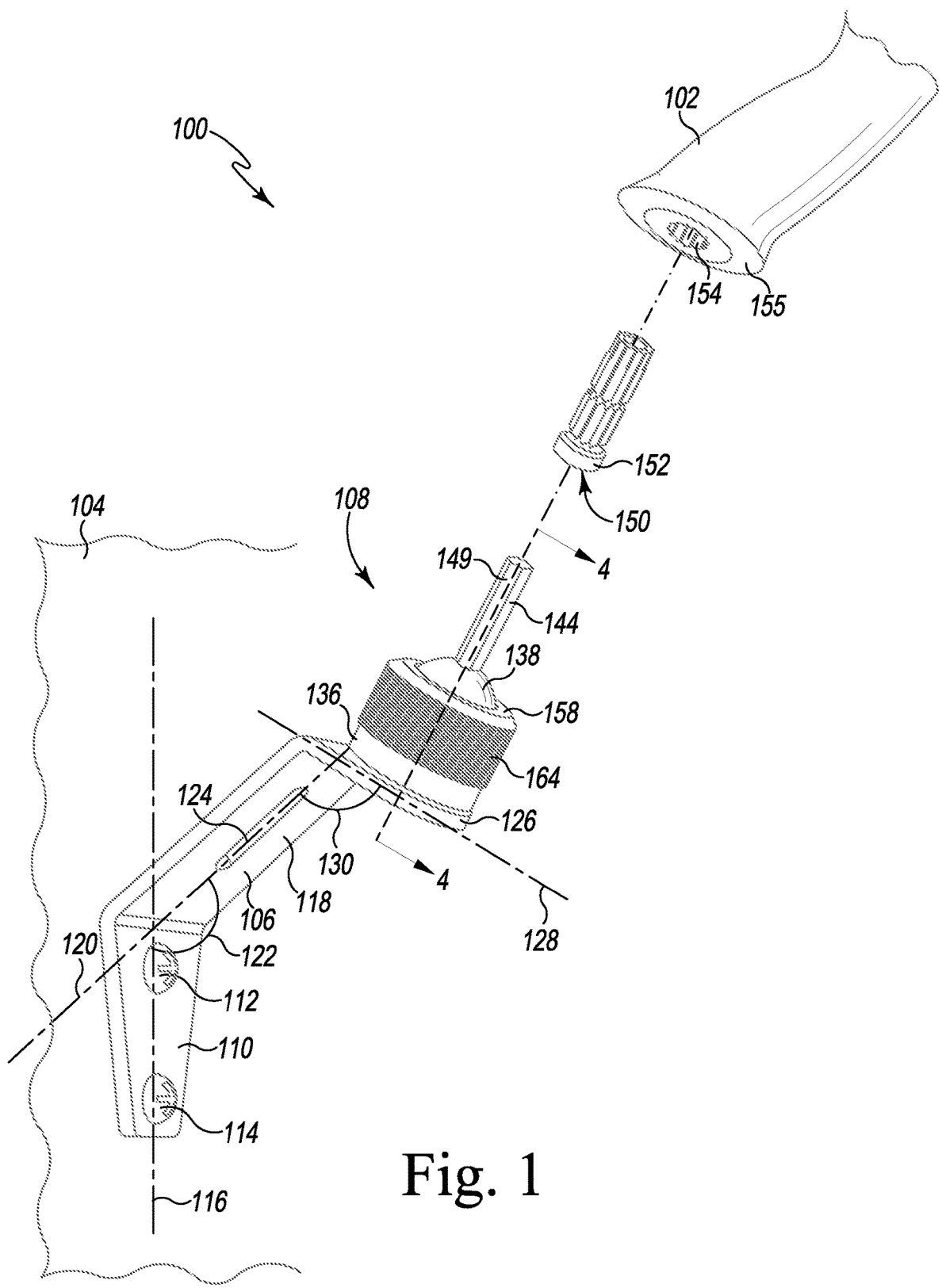
FIG. 1 depicts a first exemplary mounting system according to the present disclosure, in an illustrative environment of mounting an animal trophy to a wall.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Embodiments illustrated and described herein provide devices and systems for mounting and displaying animal trophies in a more versatile manner. Embodiments more effectively accommodate a display of matching antler sets, single antlers, and cut-off antlers, while allowing improved positioning of the animal trophies in manners (e.g., at particular angles) which provide a realistic animal appearance. Additionally, embodiments described herein enable the animal trophy to be periodically demounted for handing without exposing the animal trophy to damage and degradation of the internal structures.

Depicted in FIGS. 1-2 is an exemplary mounting system 100 configured to mount and display an animal trophy 102. The mounting system 100 can couple to a structure 104, for example, a wall, column, pole, fence, stand or any upright or substantially vertical structure. In the example shown by FIG. 1, the mounting system 100 is attached to a wall 104 and illustrates an exemplary method of mounting a single antler 102 that has been shed by a deer.

Depicted in FIG. 1, the mounting system 100 includes a support bracket 106 configured to be attached to the structure 104 and a trophy coupler assembly, such as joint mechanism 108, attached to the support bracket 106. The support bracket 106 includes: (a) a structure engager 110 (e.g., a first mounting face or first mounting feature) defining a plurality of openings 112, 114 (each illustrated with an engaged screw) located on a first axis 116; (b) a body 118 extending from the structure engager 110 along a second axis 120 that intersects with the first axis 116 at an internal angle 122 in the range of approximately 120 to 150 degrees, wherein the body 118 defines an elongated slot 124; and (c) a support 126 (e.g., a second mounting face or second mounting feature) extending from the body 118 along a third axis 128 that intersects with the second axis 120 at a second internal angle 130 in the range of approximately 90 to 120 degrees, wherein the support 126 defines an opening 132 allowing engagement to the joint mechanism 108.

The openings 112, 114 are each configured to receive a fastener (e.g., a threaded fastener such as a screw or bolt) or other fastener to secure the structure engager 110 to the mounting structure 104. The opening 132 is configured to receive the coupler or fastener 134 of the trophy coupler assembly 108.

The elongated slot 124 is configured to reduce the weight of the support bracket 106 and is also configured to receive a coupler of an accessory (not shown) that can be removeably mounted to the support bracket 106. An accessory, for example, could be an attachable label that could be customized with text to tell the story of the hunt, could be a light to illuminate the animal trophy, or the slot 124 could simply be used to identify the animal trophy that is being displayed.

With reference to FIGS. 2-3, the trophy coupler assembly 108 includes: (a) a socket, case, or cap (e.g., retainer cap 136) defining an interior cavity; (b) a ball 138 which at least partially fits within the retainer cap 136; (c) a friction pad (e.g., flexible pad 140) configured to engage the ball 138; (d) a base 142 configured to support the friction pad 140 and the ball 138; (e) the fastener 134 configured to attach and secure the base 142 to the support 126 of the support bracket 106; (f) a trophy insert (e.g., post or arm 144) having a first end 146 configured to be fixedly secured to the ball 138 and a second end 148 configured to be received by an interface insert 152; and (g) an interface insert 152 configured to releasably receive the trophy insert 144 within the bore (e.g., cavity 150), and to be fixed within of the animal trophy 102. The interface insert 152 then holds the trophy insert 144 in place utilizing a friction fit.

The embodiment illustrated in FIGS. 1-2 includes a single-wall support bracket 106 which may be comprised of aluminum or any other rigid material. In at least one embodiment, the support bracket 106 is comprised of 0.125-inch thick aluminum before being milled and formed into shape. However, the support bracket may be manufactured with an alternative material and thickness, as preferred.

Figure 4:
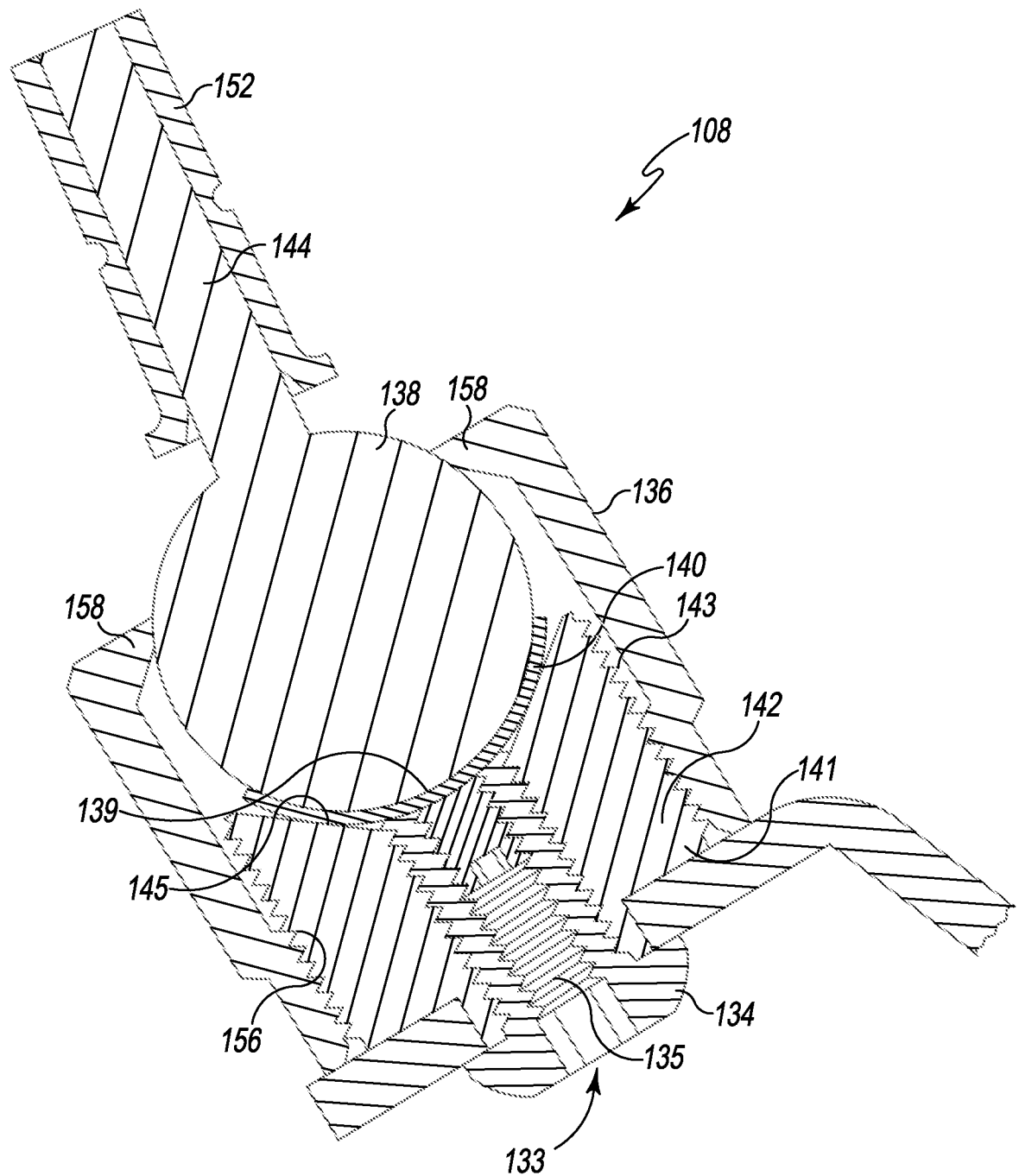
FIG. 4 depicts a cross-section view of the exemplary mounting system of FIG. 1 taken along section line 4-4.

With reference to FIGS. 2-4, the base 142 may include a first locking feature (e.g., threaded ring or threaded outer surface 143) which is connectable to the second locking feature located on the retainer cap 136. At the distal end of the base (i.e., positioned away from the support 126) is a seat 145 for accepting a proximal surface 139 of the ball 138 (i.e., positioned toward the support 126). In one embodiment, the seat 145 surface is conical and slopes linearly toward the center of the seat 145. In other embodiments, the seat 145 is spherical, for example, to match the curvature of the ball 138. The base can connect to the support at the proximal end 141 of the base 142. The base 142 may also include a passageway 147 through its center wherein a threaded connector, such as fastener 134 and/or set screw 135 (see FIG. 3), may be inserted to press directly against the ball 138 (in absence of a friction pad 140) or indirectly against the ball 138 by way of pressing against the friction pad 140.

The fastener 134, which may be primarily used for coupling the base 142 to the support 126, may include a threaded bore (e.g., opening 133) through its center wherein a set screw 135 may be threaded through the center of the fastener 134 to make contact with the friction pad 140 and/or ball 138. As illustrated in FIG. 3, the fastener may include a polygonal (e.g., a hexagonal) rotational drive socket having a first diameter, while the inner set screw 135 may include a polygonal rotational drive socket having a second, smaller diameter. As such, a user may attach the base 142 to the support 126 without tightening the set screw 135 against the ball 138, or the user may attach the base 142 to the support 126 and thereafter tighten the set screw 135 against the friction pad 140 and/or ball 138 to increase the clamping/locking force applied to the ball 138 and therefore hinder rotational movement of the ball 138 in any of the three possible rotational axes x, y, and z 137 (FIG. 2).

The friction pad 140 may be a thin, flexible disc comprised of urethane or any other material to increase friction, whether or not compressible. When placing the friction pad 140 between the base 142 and the ball 138, another area of frictional contact is added to the ball to restriction rotational movement. The friction pad 140 may be a ¾-inch disc of urethane which may be cut from a 1/16-inch thick sheet. The urethane serves two purposes: (1) it allows for smoother operation when orienting the ball, and (2) it adds friction and helps to "lock" the ball 138 in place (i.e., restrict movement of the ball in any of the three axes). When compressed against the ball 138, the friction pad 140 assumes a concave shape, conforming to the shape of the ball 138. The friction pad 140 is configured to increase the frictional resistance between the ball 138 and the base 142 thereby increasing the clamping force on the ball 138 and resisting movement. This frictional resistance enables the mounting system 100 to hold relatively heavy animal trophies at variable angles without the ball moving under the torque applied to it through the weight of the trophy transmitted to the ball 138 via post 144.

The ball 138 may be comprised of steel and may include a trophy insert (e.g., steel post 144). The trophy insert 144 and ball 138 may be machined as a single, combined element, or alternatively the trophy insert 144 and ball 138 may be attached together with threads, welded to the ball 138, or by any other similar attachment technique. Although steel is utilized in at least one embodiment, other similar rigid materials may be used.

The cap, for example, retainer cap 136, defines a cylindrical body having an opening on the proximal end 160 and an opening on the distal end 162 (relative to the support 126) and forms a socket for the ball when fully assembled. The retainer cap includes (a) an inner locking feature (e.g., threaded surface 156), (b) a retaining feature (e.g., annular ring 158) at the distal end and may include a knurled surface 164 for enhanced gripping. After the ball 138 is placed in contact with the base 142, the retainer cap 136 is positioned over the ball 138 with the trophy insert 144 projecting through the distal end 162 opening and the retainer cap 136 is locked (e.g., threaded or otherwise secured) onto the base 142. As the retainer cap 136 is locked onto the base 142, the annular ring 158 contacts the ball 138 and applies downward force onto the ball 138 toward the base 142. As the retainer cap 136 is fully locked onto the base 142, the ball 138 becomes clamped into place and rotational movement is prevented for even large, heavy trophies. Optionally, in some embodiments, one or more set screws (not shown) may be inserted through threaded bores (not shown) through the cylindrical knurled surface 164 of retainer cap 136 to further restrict movement of the ball 138.

The trophy post 144, in an embodiment, includes: (a) the first end 146; (b) a second end 148; and (c) a body, such as a cylindrical body 149. In some embodiments, the first end 146 is threaded and can be screwed into a threaded opening (not shown) in the ball 138. The second end 148 and body 149 may have a non-circular cross-sectional profile to provide a rotational locking feature, such as a polygonal cross-section. In illustrated embodiment, the cross-sectional profile of the body 149 is polygonal, for example, 3/16 hexagonal. In other embodiments, the cross-sectional profile of the body 149 may be keyed, square, rectangular, triangular, star-shaped or of any other multi-sided variations. The multi-sided shape enhances the coupling of the trophy insert 144 through the opening 150 into the interface insert 152 which may be pre-installed into an end 155 of the animal trophy 102. For example, a trophy insert 144 having circular cross-sectional shape may permit the animal trophy 102 to undesirably rotate axially (i.e., relative to the central axis of the insert interface 152) and relative to the trophy insert 144 as the connection between the trophy insert 144 and the insert interface 152 may slip. However, a keyed or multi-sided shape of the trophy post 144 helps to impede such undesirable rotation when paired with a corresponding rotational locking feature receiving the trophy post 144.

In at least one embodiment, the interface insert 152 includes: (a) an interior surface defining a bore (e.g., a cavity) configured to receive, and mate with, the second end 148 of the trophy insert 144; and (b) an exterior surface 153 configured to be inserted into a cavity 154 defined in the animal trophy 102. In the illustrated embodiments, the cavity of the interface insert defines a cross-sectional shape configured to conform to the rotational locking feature of, and mate with, the trophy insert 144, for example a hexagonal or other keyed or multi-sided cross-sectional shape. The inner surface of the interface insert 152 can be tapered or otherwise sized relative to the trophy insert 144 to achieve a locational fit, force fit, press fit, or frictional engagement with the trophy insert 144. The interface insert 152 can be comprised of plastic or any suitable polymer, metal or any flexible, deformable expandable material. The exterior surface 153 can include a plurality of spaced-apart friction pads or grip members, such as a 12-point insert, arranged in a plurality of grip columns, for example, as illustrated in FIG. 1.

In use, the user slides the interface insert 152 onto the trophy insert 144. Because of the tapered shape of the interface insert 152, described above, the trophy insert 144 achieves a first degree of frictional engagement with the interface insert 152. Next, the user aligns the cavity 150 of the animal trophy 102 with the interface insert 152 and then slides the animal trophy 102 onto the interface insert 152. The outer surface 153 achieves a second degree of frictional engagement between the interface insert 152 and the animal trophy 102. The second degree of frictional engagement is greater than the first degree of frictional engagement. In at least one embodiment, the rigid edges of the outer surface 153 bite into the relatively soft bone or tissue of the animal trophy 102 to achieve a secure engagement, for example, via an interference fit between interface insert 152 and a bore 154 defined in the animal trophy 102, for example at a trimmed end 155 of a shed of an antler.

To demount or detach the animal trophy 102, the user pulls upward on the animal trophy 102. Because the second degree of frictional engagement is greater than the first degree of frictional engagement, first, the interface insert 152 separates from the trophy insert 144, and the interface insert 152 remains within the animal trophy 102. The user can then demonstrate and handle the animal trophy 102 while the interface insert 152 remains implanted in the animal trophy 102. This provides advantages of preserving and protecting the interior bone and tissue of the animal trophy 102, reducing degradation to the bone and tissue. For example, repeated mounting and demounting of the animal trophy 102 will not involve interaction with the bone or tissue surrounding the cavity 150 of the animal trophy 102. Instead, in an embodiment, the interaction will be solely between the interface insert 152 and the trophy insert 144.

In other embodiments, the trophy insert 144 and interface insert 152 may connect together via a threaded connection. Connectivity between the trophy insert 144 and interface insert 152 helps to protect the delicate aspects of the animal trophy 102.

Referring back to FIG. 1, when the animal trophy 102 is mounted on the mounting system 100, the user can adjust the angle of the animal trophy 102. Under the weight of the animal trophy 102, the ball 138 does not move relative to the retainer cap 136. This is due, in part, to the friction pad 140 described above as well as the clamping force applied by tightening of the retainer cap 136 relative to a base 142 and set screw 135 against the ball 138. To adjust the angle or tilt of the animal trophy 102, the user can apply a force to the animal trophy 102, causing the ball 138 to rotate in about three dimensions within the retainer cap 136. When the user removes the force, the ball 138 remains in place and stops moving relative to the retainer cap 136.

Figure 5:
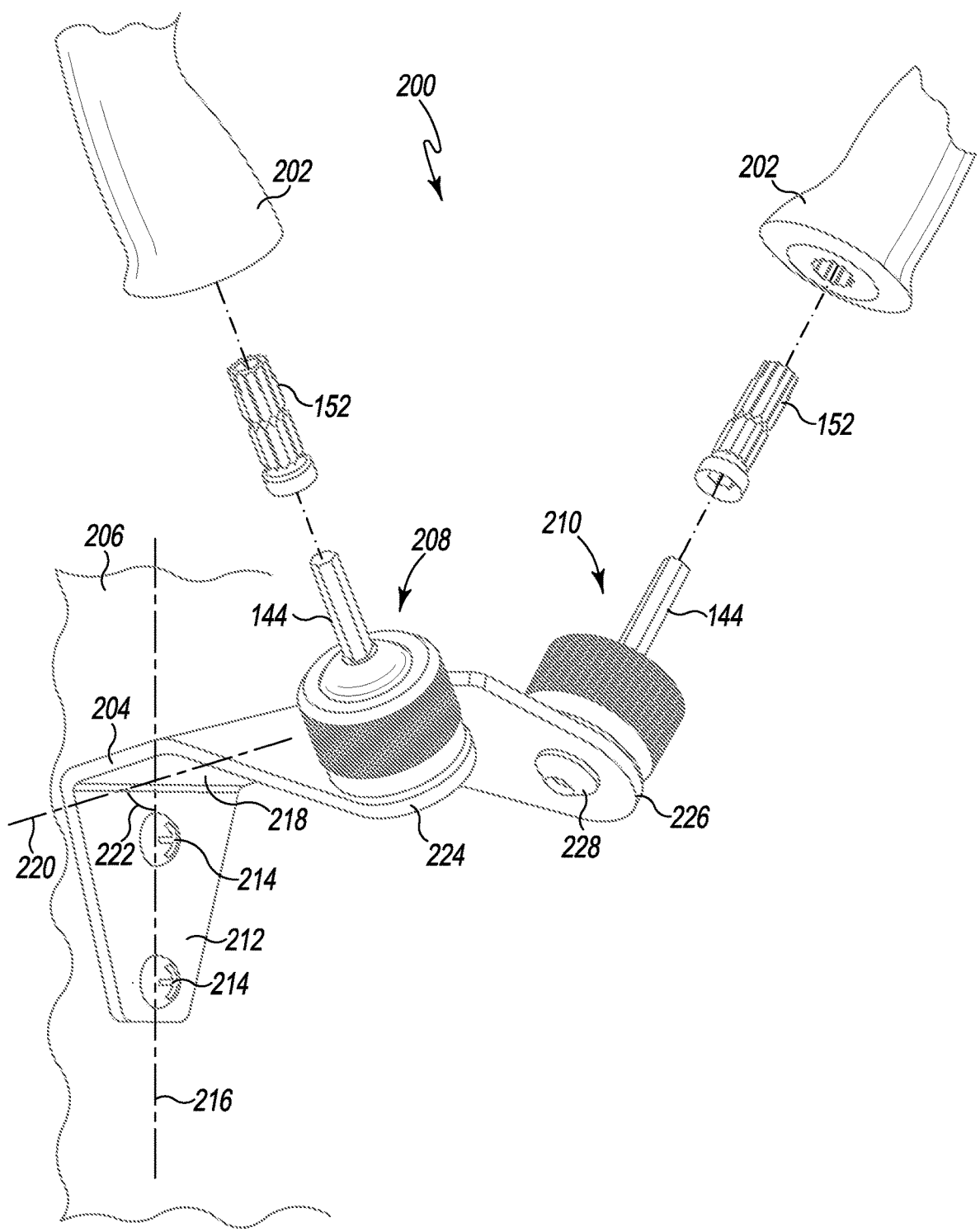
FIG. 5 depicts a second exemplary mounting system according to the present disclosure, in an illustrative environment of mounting two animal trophies.

Depicted in FIG. 5 is an animal trophy mounting system 200 for mounting two separate pieces of an animal trophy (e.g., a matched set of deer antlers 202). In an exemplary embodiment, the mounting system 200 includes: (a) a support bracket 204 configured to be attached to a mounting structure 206, for example, a wall, column, pole, fence, stand or any upright or substantially vertical structure; and (b) a plurality of trophy coupler assemblies, for example, joint mechanisms 208, 210 attached to the support bracket 204. The support bracket 204 includes: (i) a structure engager 212 defining a plurality of openings 214 located on a first axis 216; (ii) a body 218 extending from the structure engager 212 along a second axis 220 that intersects with the first axis 216 at an internal angle 222 in the range of 100 to 110 degrees, wherein the body 218 defines an elongated slot (not shown) on its body similar to the embodiment of FIG. 1; and (iii) a plurality of supports 224, 226 extending from the body 218. As illustrated in FIG. 5, each of the supports 224, 226 extends in a plane that is tilted in a downward direction (relative to the common mounting position of the support bracket 204 to a vertical wall 206) and is also tilted in a outward direction. The supports 224, 226 define openings which are each configured to receive a fastener (e.g., a threaded fastener such as screw 28 or a bolt) or other fastener to secure the joint mechanisms 208, 210 to the supports 224, 226, respectively. In an embodiment, each of the joint mechanisms 208, 210 may include the same structure, elements, configurations, parts, materials, advantages and functionality as joint mechanism 108 described herein.

Figure 6:
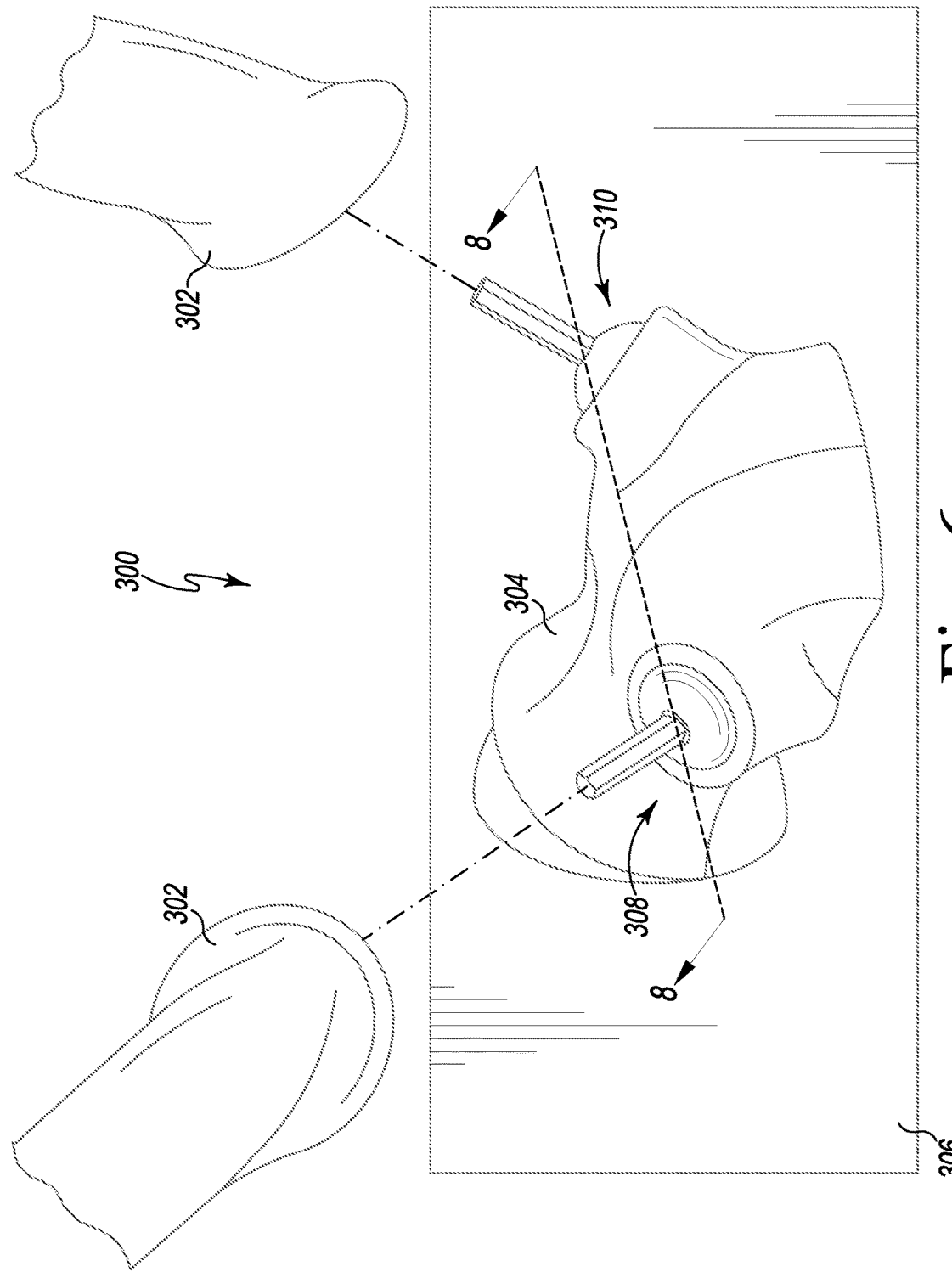
FIG. 6 depicts a third exemplary mounting system according to the present disclosure, in an illustrative environment of mounting two animal trophies.
Figure 8:
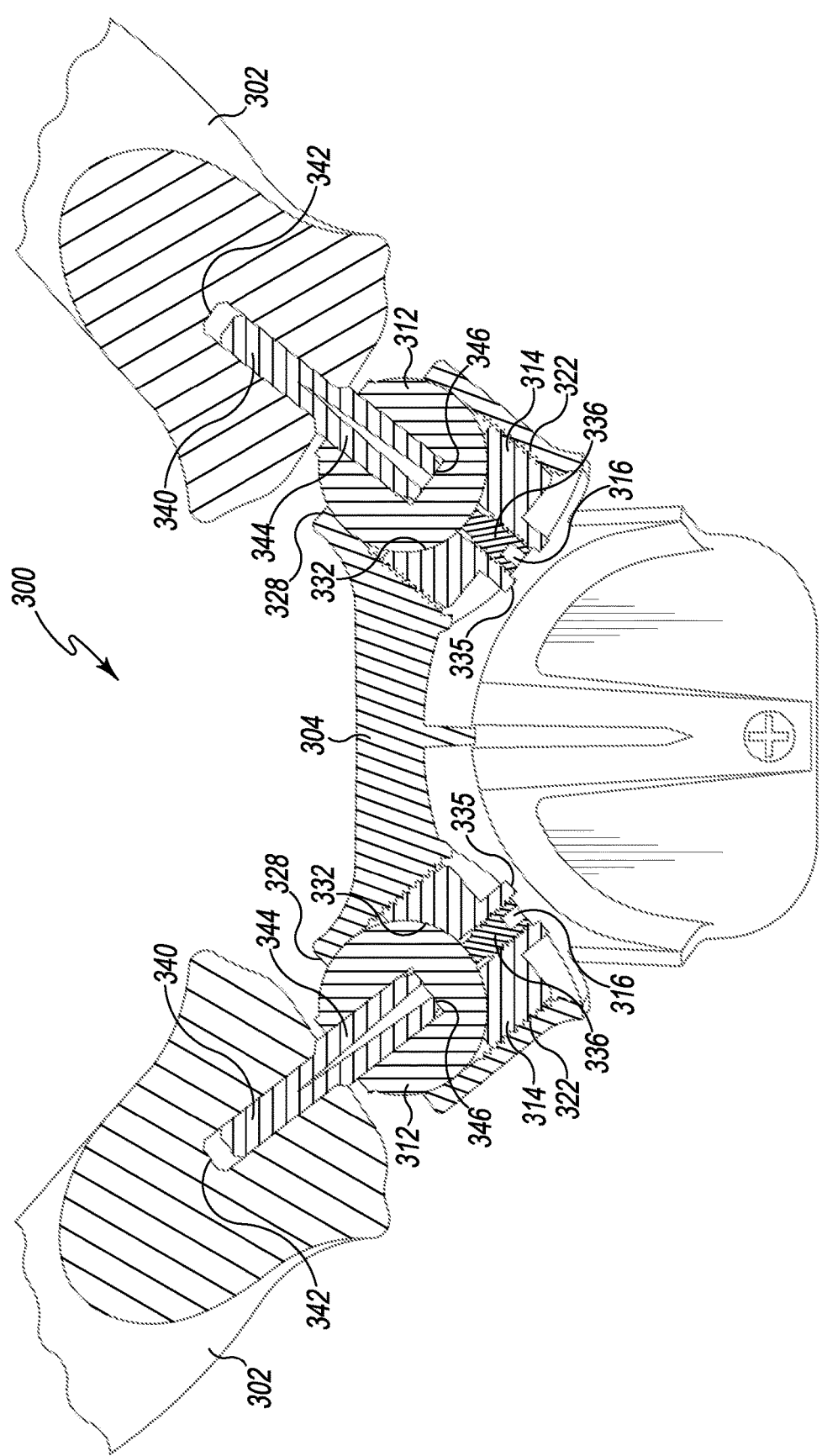
FIG. 8 depicts a cross-section of the exemplary mounting system of FIG. 6 taken along section line 8-8.

Depicted in FIG. 6 is an animal trophy mounting system 300 for mounting two separate pieces of an animal trophy (e.g., a matched set of deer antlers 302, as shown in FIG. 8). In an exemplary embodiment, the mounting system 300 includes: (a) a support structure 304 configured to be attached to a mounting structure 306, for example, a wall, column, pole, fence, stand or any upright or substantially vertical structure, and (b) a plurality of trophy coupler assemblies, for example, rotating joint mechanisms 308, 310. In the illustrative embodiment, the support structure 304 may be formed to resemble a portion of an animal skeleton, such as an animal skull. The support structure may be manufactured, for example, from a die cast using a combination of a zinc and aluminum mixture, or alternatively any material which provides similar rigid properties which may be of suitable strength and structure.

Figure 7:
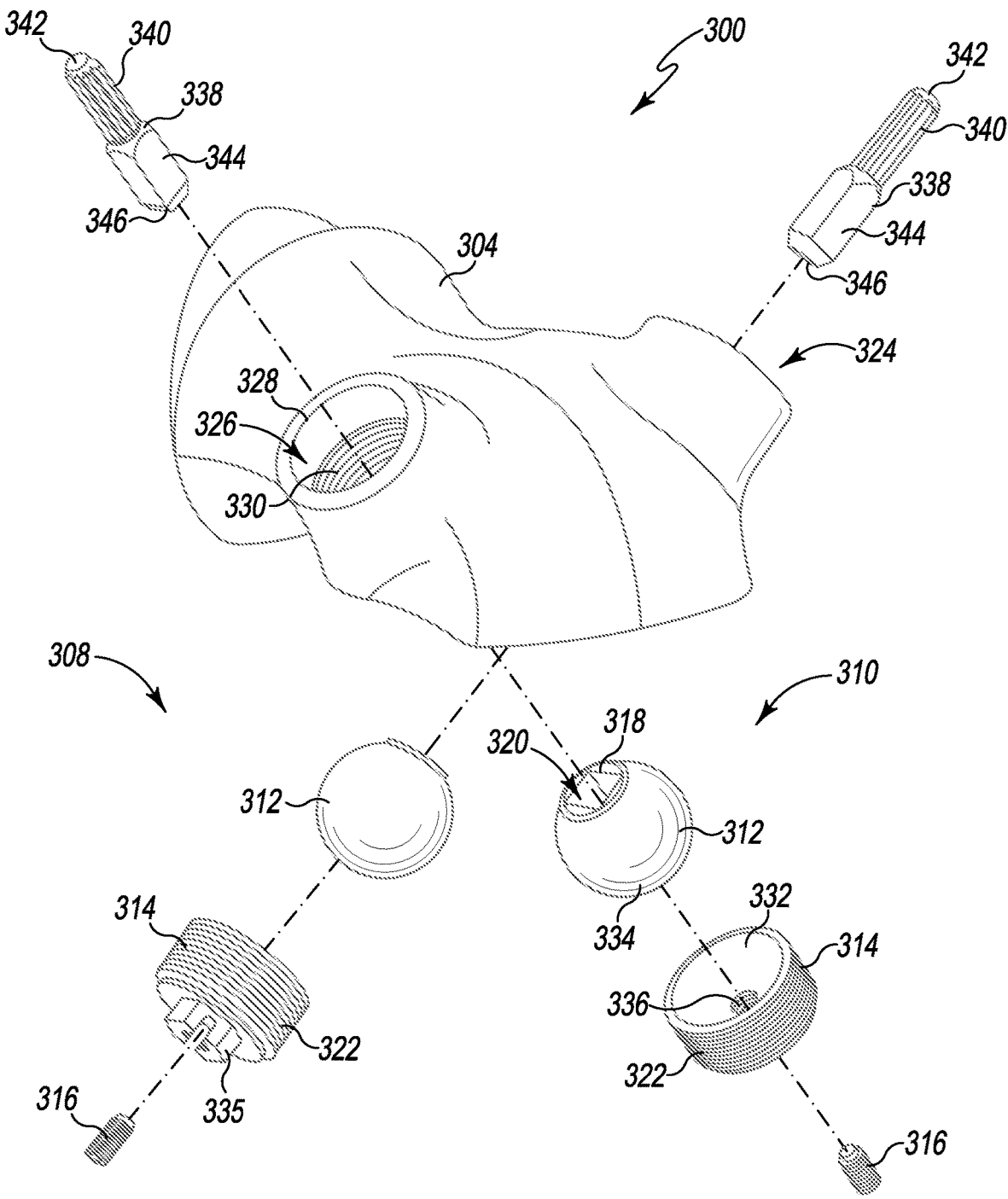
FIG. 7 depicts an exploded view of the exemplary mounting system of FIG. 6.

Depicted in FIGS. 7-8 is an exploded view of the exemplary mounting system 300. The mounting system 300 can include a plurality of rotating joint mechanisms 308, 310 which share the same structure, elements, configurations, parts, materials, advantages and functionality as one another. Each rotating joint mechanism 308, 310 can include: (a) a ball 312, a base 314, and optionally a set screw which can be inserted through the base to apply pressure to the ball. The base 314 of the rotating joint mechanisms 308, 310 are each configured to thread into sockets 324, 326, for example, optionally defined by the support structure 304, respectively, with each ball 312 positioned between each base 314 and the respective annular seat 328 of the sockets 324, 326. To receive the threaded surface 322 of the base, each socket includes a threaded receiving surface 330 defined by the inner surface of the socket.

The ball 312 includes a bore (e.g., opening 318) for a cavity 320 which extends from the ball surface into a central portion of the ball 312. The opening 318 defines a shape having a non-circular cross-sectional profile. In illustrated embodiment, the cross-sectional profile of the opening 149 is squared. In other embodiments, the cross-sectional profile of the opening 318 may be keyed, polygonal (e.g., hexagonal), rectangular, triangular, star-shaped or of any other multi-sided variations providing a rotational locking feature. The ball 312 may be comprised of steel for strength, however, other rigid materials may be used.

The base 314 includes a threaded outer surface 322, and connectable to the distal end of the base is a seat 332 for accepting a proximal surface 334 of the ball 312. In one embodiment, the seat 332 surface is conical and sloping linearly downward toward the center of the seat 332. In other embodiments, the seat 332 is spherical, for example, to match the curvature of the proximal surface 334 of the ball 312. The base 312 may also include a passageway 336 through its center rotational drive member 335 wherein a threaded connector, such as a set screw 316, may be inserted to press directly against the ball 312 to increase the clamping/locking force applied to the ball 312 and therefore resist rotational movement of the ball 312. In some embodiments, a frictional element (e.g., friction pad 140 of FIG. 2) may be positioned between the base 314 and ball 312 to engage the ball 312 and restriction rotational movement.

Once the ball 312 is positioned within the respective socket 324, 326 and the base 314 is threadedly engaged to the respective threaded surface 330 to hold the ball 312 into place, an animal trophy 302 may be coupled to each rotating joint mechanism 308, 310. Before coupling the animal trophy 302 to a rotating joint mechanism 308, 310, the animal trophy 302 may be outfitted with a coupling member 338 to facilitate the coupling. The coupling member 338 includes an integrated interface insert 340 having rigid edges 340 formed onto the outer surface of a distal end 342 of the coupling member 338 which bite into the relatively soft bone or tissue of the animal trophy 302 to embed within the animal trophy 302 and achieve a secure engagement. Furthermore, the coupling member 338 defines a shape at its proximate end 346 having a non-circular cross-sectional profile which matches that of the opening 318 of the ball 312. In illustrated embodiment, the cross-sectional profile of the coupling member 338 is square. In other embodiments, the cross-sectional profile of the coupling member 338 may be keyed, polygonal (e.g., hexagonal), rectangular, triangular, star-shaped or of any other multi-sided variations, so long as it provides a rotational locking feature that matches the shape of the opening 318 of the ball 312.

In use, the user install the interface insert 340 of the coupling member 338 into the animal trophy 302. Next, the user slides the coupling member 338 into the cavity 320 of the ball 312 and adjusts the animal trophies 302 to the desired position about three dimensional axes as discussed for embodiment 100. The user then tightens the base 314 to apply a desired force to retain each animal trophy 302 in the desired position. Finally, additionally or alternatively, for example, if more force is needed, the user may thread the set screw 316 through the base to apply additional force onto the proximal surface 334 of the ball 312.

To demount or detach the animal trophy 302, the user pulls upward on the animal trophy 302 and slides the coupling member 338 out of the cavity 320 of the ball 312. The user can then demonstrate and handle the animal trophy 302 while the coupling member 338 and integrated interface insert 340 remains implanted in the animal trophy 302. This provides advantages of preserving and protecting the interior bone and tissue of the animal trophy 302, reducing degradation to the bone and tissue.

In any one of the embodiments described herein, each part forming the mounting system may be treated or coated in a material which results in the mount being more durable and/or aesthetic. For example, the mounting systems may be treated to achieve a black oxide finish.

Figure 9:
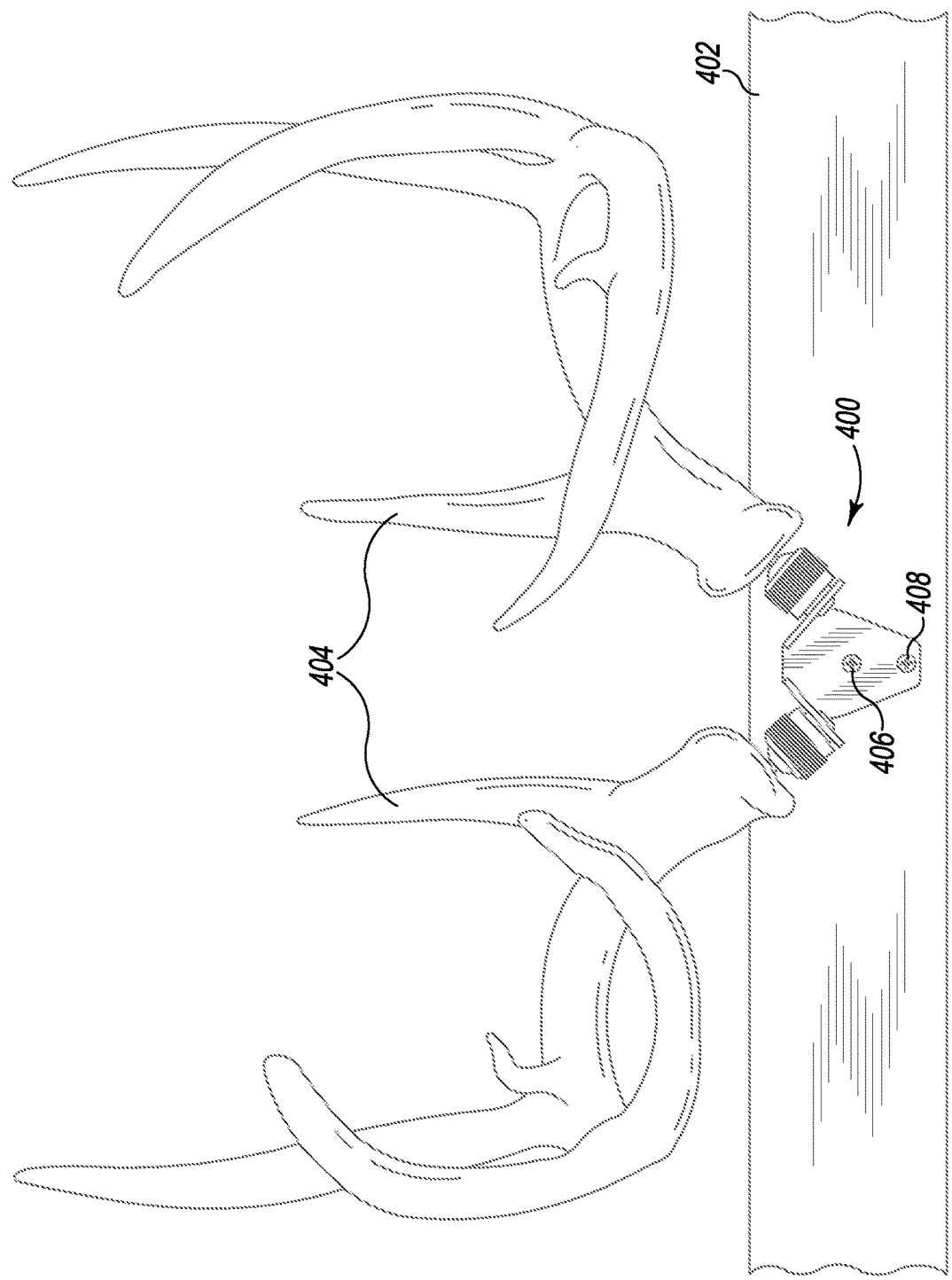
FIG. 9 depicts the exemplary mounting system of FIG. 5 in an illustrative environment of mounting a set of antlers to a post.

Depicted in FIG. 9 is the exemplary mounting system 400 of FIG. 5 illustrated coupled to a post structure 402 with an attached set of deer antlers 404. In this illustrative embodiment, two screws 406, 408 are used to mount the system 400 to the post. In one exemplary method of preparing to mount the antlers, a drill and a drill bit can be utilized to drill an opening 154 into the center of the antler pedicle 155, as shown in FIG. 1. Next, an interface insert 152, 340 can be pressed into place and locked into the drilled opening by friction. For example, for a 3/16-inch steel stem, drilling a 5/16-inch opening into the bottom of the antler at 1-inch or less in depth provides adequate friction. After the antlers are installed with an interface insert 152, 340 they may be positioned onto the coupling members and rotated to the desired positions. Finally, the retainer cap and/or set screw can each be tightened to ensure the antlers 404 remain in a secure position without rotating from the weight of the antlers.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, force, resistance, etc.) may be used explicitly or implicitly herein, such specific quantities are presented as examples only and are approximate values unless otherwise indicated.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

What is claimed is:

1. A detachable mounting system for displaying an animal trophy, comprising: a post having a post outer surface defining a first rotational locking feature; an interface insert defining a central bore and an interface outer surface, the interface insert configured to releasably mate with the post by receiving the post into the central bore, the central bore defining a second rotational locking feature, and the interface outer surface defining spaced-apart grip members to fixedly embed the interface insert into the animal trophy; wherein engagement of the first and second rotational locking features restricts axial rotation of the post; and wherein the interface insert and animal trophy are capable of being selectively detached and reattached to the post.

2. The detachable mounting system of claim 1, wherein the first and second rotational locking features comprise corresponding polygonal shapes.

3. The detachable mounting system of claim 1, wherein the grip members are segmented splines.

4. The detachable mounting system of claim 1, further comprising a mounting feature coupled to the post.

5. The detachable mounting system of claim 1, further comprising a support bracket configured to attach to a mounting surface, and wherein the post is coupled to the support bracket.

6. The detachable mounting system of claim 5, further comprising:
   a ball coupled to the post;
   a base coupled to the support bracket and defining a first locking feature, the base including a bearing seat configured to support a portion of the ball and permit the ball to simultaneously rotate about three axes; and
   a socket having a retaining feature at a first end and second locking feature at a second end configured to mate with the first locking feature of the base forming a locking connection, wherein the socket is configured to retain the ball in a position between the retaining feature and the base, providing increased force onto the ball and securing the position of the ball and animal trophy relative to the base.

7. The detachable mounting system of claim 6, further comprising:
   a flexible pad positioned between the ball and base for increasing the friction applied to the ball by the base.

8. The detachable mounting system of claim 6, further comprising:
   a set screw located coaxially within and extending through a first fastener, wherein the set screw is configured to apply one of direct and indirect force to the ball of a first joint mechanism.

9. The detachable mounting system of claim 1, wherein the grip members are spaced apart around the diameter of the interface outer surface.

10. The detachable mounting system of claim 1, wherein the grip members vary in diameter along the length of the interface insert.

11. The detachable mounting system of claim 1, wherein the grip members are segmented along the length of the interface insert.

12. The detachable mounting system of claim 1, wherein the grip members and engagement features of the central bore of the insert interface and the outer surface of the post are configured such that a first degree of frictional engagement of the insert member embedded into the animal trophy is greater than a second degree of frictional engagement of the insert interface onto the post.

* * * * *